United States Patent
Ouyang et al.

(10) Patent No.: US 10,338,312 B2
(45) Date of Patent: Jul. 2, 2019

(54) PHOTONIC CRYSTAL ALL-OPTICAL SELF-AND-TRANSFORMATION LOGIC GATE

(71) Applicant: Zhengbiao Ouyang, Shenzhen, Guangdong (CN)

(72) Inventors: Zhengbiao Ouyang, Guangdong (CN); Quanqiang Yu, Guangdong (CN)

( * ) Notice: Subject to any disclaimer, the term of this patent is extended or adjusted under 35 U.S.C. 154(b) by 0 days.

(21) Appl. No.: 15/626,256

(22) Filed: Jun. 19, 2017

(65) Prior Publication Data

US 2017/0293079 A1    Oct. 12, 2017

Related U.S. Application Data

(63) Continuation of application No. PCT/CN2015/097849, filed on Dec. 18, 2015.

(30) Foreign Application Priority Data

Dec. 19, 2014 (CN) .......................... 2014 1 0796527

(51) Int. Cl.
*G02B 6/122* (2006.01)
*G02F 3/00* (2006.01)
(Continued)

(52) U.S. Cl.
CPC ........... *G02B 6/1225* (2013.01); *G02B 6/125* (2013.01); *G02F 1/365* (2013.01); *G02F 3/00* (2013.01);
(Continued)

(58) Field of Classification Search
CPC .................. G02B 6/1225; G02B 6/125; G02B 2006/1213; G02F 1/365; G02F 3/00;
(Continued)

(56) References Cited

U.S. PATENT DOCUMENTS 10,042,117 B2 *   8/2018  Ouyang .................... G02F 3/00
2006/0062507 A1   3/2006  Yanik et al.
(Continued)

FOREIGN PATENT DOCUMENTS

CN              102226862 A      10/2011

OTHER PUBLICATIONS

2nd Office Action of counterpart Chinese Patent Application No. 201410796527.X dated Feb. 17, 2017.

*Primary Examiner* — Stephone B Allen
*Assistant Examiner* — Adam W Booher

(57) ABSTRACT

The present invention discloses a PhC all-optical self-AND-transformation logic gate, which comprises an optical-switch unit, a PhC-structure unit, a NOT-logic gate and a D-type flip-flop unit; said clock-signal CP is connected with an input port of the two-branch waveguide, said two output ports of the two-branch waveguide are respectively connected with the input port of said NOT-logic gate and a first clock-signal-input port of said PhC-structure unit; the output port of said NOT-logic gate is connected with the second clock-signal-input port of said D-type flip-flop unit; the signal-output port of the PhC structure is connected with the D-signal-input port of said D-type flip-flop unit; a logic-signal X is connected with the logic-signal-input port of said PhC-structure unit. The structure of the present invention is compact in structure and ease of integration with other optical-logic elements.

10 Claims, 4 Drawing Sheets

(51) Int. Cl.
  *G02B 6/125* (2006.01)
  *G02F 1/365* (2006.01)
  *B82Y 20/00* (2011.01)
  *G02B 6/12* (2006.01)

(52) U.S. Cl.
  CPC ....... *B82Y 20/00* (2013.01); *G02B 2006/1213* (2013.01)

(58) Field of Classification Search
  CPC . G02F 3/02; G02F 3/024; G02F 3/028; B82Y 20/00; G06E 1/00; G06E 1/02; H03K 19/14
  See application file for complete search history.

(56) References Cited

U.S. PATENT DOCUMENTS

2017/0307823 A1* 10/2017 Ouyang .................... G02F 3/00
2017/0307960 A1* 10/2017 Ouyang .................... G02F 1/35

\* cited by examiner

| A | B | C | Y |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |

FIG.4

PHOTONIC CRYSTAL ALL-OPTICAL SELF-AND-TRANSFORMATION LOGIC GATE

CROSS-REFERENCE TO RELATED APPLICATION

This application is continuation application of PCT Application No. PCT/CN2015/097849 filed on Dec. 18, 2015, which claims priority to Chinese Patent Application No. 201410796527.X filed on Dec. 19, 2014, the entire contents of which are hereby incorporated by reference.

FIELD OF THE INVENTION

The present invention relates to two-dimensional (2D) photonic crystal (PhC) optical self-AND-transformation logic gates.

BACKGROUND OF THE INVENTION

In 1987, the concept of PhC-was proposed separately by E. Yablonovitch from United States Bell Labs who discussed how to suppress spontaneous radiation and by S. John from Princeton University who made discussions about photonic localization. A PhC is a material structure in which dielectric materials are arranged periodically in space, and is usually an artificial crystal consisting of two or more materials having different dielectric constants.

With the emergence of and in-depth research on PhC, people can control the motion of photons in a PhC material more flexibly and effectively. In combination with traditional semiconductor processes and integrated circuit technologies, design and manufacture of PhCs and devices thereof have continually and rapidly marched towards all-optical processing, and the PhC has become a breakthrough for photonic integration. In December 1999, the PhC was recognized by the American influential magazine *Science* as one of the top-ten scientific advances in 1999, and therefore has become a hot topic in today's scientific research field.

An all-optical-logic device mainly includes an optical amplifier-based logic device, a non-linear loop mirror logic device, a Sagnac-interference-type logic device, a ring-cavity logic device, a multi-mode-interference logic device, an optical-waveguide-coupled logic device, a photoisomerized logic device, a polarization-switch optical-logic device, a transmission-grating optical-logic device, etc. These optical-logic devices have the common shortcoming of large size in developing large-scale integrated optical paths. With the improvement of science and technology in recent years, people have also done research and developed quantum-optical-logic devices, nanomaterial-optical-logic devices and PhC optical-logic devices, which all conform to the dimensional requirement of large-scale photonic or optical integrated circuits. For modern manufacturing processes, however, the quantum-optical-logic devices and the nano-material-optical-logic devices are very difficult to be manu-factured, whereas the PhC optical-logic devices have competitive advantages in terms of manufacturing process.

In recent years, PhC logic devices have become a hot area of research drawing widespread attentions, and it is highly likely for them to replace the current widely-applied electronic logic devices in the near future. The PhC logic device can directly realize all-optical-logical functions, such as "AND", "OR", "NOT" and the like, and is a core device for realizing all-optical computing. In the process of realizing all-optical computing, PhC logical-function devices based on "AND", "OR", "NOT", "XOR" and the like have been successfully designed and investigated, and various complex logic components are still needed for achieving the goal of all-optical computing.

SUMMARY OF THE INVENTION

The present invention is aimed at overcoming the defects of the prior art and providing a PhC all-optical self-AND-transformation logic gate with compact structure, strong anti-interference capability and ease of integration with other optical-logic elements.

The technical proposal adopted by the invention to solve the technical problem is as follows:

A PhC all-optical self-AND-transformation logic gate of the present invention comprises a PhC-structure unit, a NOT-logic gate and a D-type flip-flop (DFF) unit; said clock-signal CP is connected with an input port of the two-branch waveguide, said two output ports of the two-branch waveguide are respectively connected with the input port of said NOT-logic gate and a first clock-signal-input port of said PhC-structure unit; the output port of said NOT-logic gate is connected with the second clock-signal-input port of said DFF unit; the signal-output port of the PhC-structure unit is connected with the D-signal-input port of said DFF unit; a logic-signal X is connected with the logic-signal-input port of said PhC-structure unit.

The PhC-structure unit is a 2D-PhC cross-waveguide nonlinear cavity and is a 2D-PhC cross-waveguide four-port network formed by high-refractive-index pillars, the four-port network has a four-port PhC structure, a left port is said first intermediate-signal-input port, a lower port is said second intermediate-signal-input port, an upper port is a signal-output port, and a right port is an idle port; two mutually-orthogonal quasi-1D PhC structures are placed in two waveguide directions crossed at a center of said cross waveguide, a dielectric pillar is arranged in a middle of said cross-waveguide, said dielectric pillar is made of a nonlinear material, and a cross section of said dielectric pillar is square, polygonal, circular or oval; and the dielectric constant of a rectangular linear pillar clinging to the central nonlinear pillar and close to the signal-output port is equal to that of said central nonlinear pillar under low-light-power conditions; and said quasi-1D PhC structures and said dielectric pillar constitute a waveguide defect cavity.

The DFF unit comprises a clock-signal-input port, a D-signal-input port and a system-output port; the D-signal-input port of said DFF unit is connected with the signal-output port of said PhC-structure unit.

The 2D-PhC is a $(2k+1)\times(2k+1)$ array structure, where k is an integer more than or equal to 3.

The cross section of the high-refractive-index dielectric pillar of said 2D-PhC is circular, oval, triangular or polygonal.

A background filling material for the 2D-PhC is air or a different low-refractive-index medium with a refractive index less than 1.4.

The refractive index of said dielectric pillar in the quasi-1D PhC of said cross waveguide is 3.4 or a different value more than 2, and the cross section of said dielectric pillar in said quasi-1D PhC is rectangular, polygonal, circular or oval.

Compared with the prior art, the present invention has the following advantages:

1. Compact in structure, and ease of manufacture;
2. Strong anti-interference capability, and ease of integration with other optical-logic elements; and 3. High contrast of high and low logic outputs, and fast operation.

These and other objects and advantages of the present invention will become readily apparent to those skilled in the art upon reading the following detailed description and claims and by referring to the accompanying drawings.

FIG. 1 is a structural schematic diagram of a PhC all-optical self-AND-transformation logic gate of the present invention;

In FIG. 1, the indications are: PhC-structure unit 01, first clock-signal-input port 11, logic-signal-input port 12, idle port 13, signal-output port 14, circular high-refractive-index linear-dielectric 15, first rectangular high-refractive-index linear-dielectric pillar 16, second rectangular high-refractive-index linear-dielectric pillar 17, central nonlinear-dielectric pillar 18, logic-input signal X, clock control-signal CP, NOT-logic gate 02, DFF unit 03, second clock-signal-input port 31, D-signal-input port 32, and system-signal-output port 33.

FIG. 4 is a truth table of the logic functions of a 2D-PhC cross-waveguide nonlinear cavity shown in FIG. 1.

The present invention is more specifically described in the following paragraphs by reference to the drawings attached only by way of example.

DETAILED DESCRIPTION OF THE EMBODIMENTS

The terms a or an, as used herein, are defined as one or more than one, the term plurality, as used herein, is defined as two or more than two, and the term another, as used herein, is defined as at least a second or more.

Figure 1:
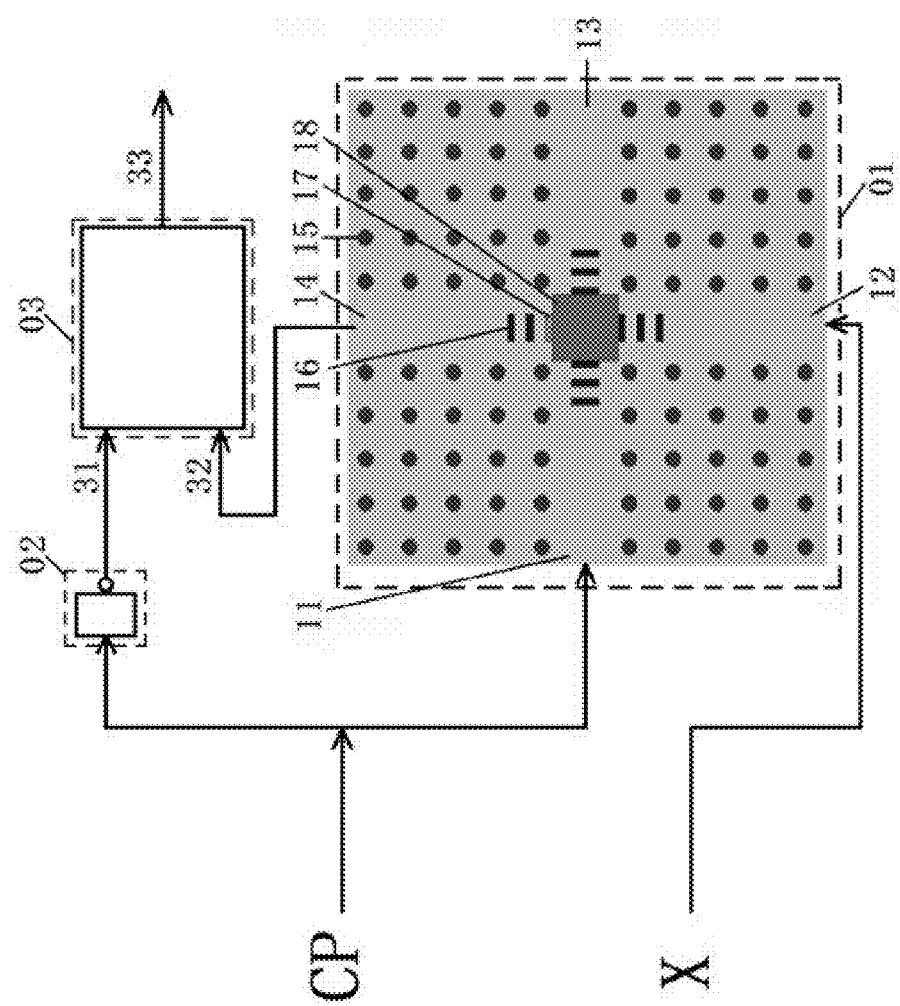

As shown in FIG. 1, the PhC all-optical self-AND-transformation logic gate of the present invention comprises a PhC-structure unit 01, a NOT-logic gate 02 and a DFF unit 03; the PhC-structure unit 02 is a 2D-PhC cross-waveguide nonlinear cavity and is arranged behind the optical switch unit, the background filling material for the 2D PhC is air or a different low-refractive-index medium with the refractive index less than 1.4, the cross section of the high-refractive-index dielectric pillar of the 2D PhC is circular, oval, triangular or polygonal, the 2D-PhC cross-waveguide nonlinear cavity is a 2D-PhC cross-waveguide four-port network formed by high-refractive-index dielectric pillars, the four-port network has a four-port PhC structure, the left port is a clock-signal-input port, the lower port is a logic-signal-input port, the upper port is a signal-output port, and the right port is an idle port; two mutually-orthogonal quasi-1D PhC structures are placed in two waveguide directions crossed at the center of a cross-waveguide, the cross section of the dielectric pillar in the quasi-1D PhC is rectangular, polygonal, circular or oval, the refractive index of the dielectric pillar is 3.4 or a different value more than 2, an dielectric pillar is arranged in the middle of the cross-waveguide, the dielectric pillar is made of a nonlinear material, the cross section of the dielectric pillar is square, polygonal, circular or oval, and the quasi-1D PhC structures and the dielectric pillar constitute a waveguide defect cavity. The lattice constant of the 2D-PhC array is d, and the array number is 11×11; the circular high-refractive-index linear-dielectric pillar 15 is made of a silicon (Si) material, and has a refractive index of 3.4 and a radius of 0.18d; the first rectangular high-refractive-index linear-dielectric pillar 16 has a refractive index of 3.4, long sides of 0.613d and short sides of 0.162d; the second rectangular high-refractive-index linear-dielectric pillar 17 has a dielectric constant being the same as that of a nonlinear-dielectric pillar under low-light-power conditions, and has a dimension equal to that of the first rectangular high-refractive-index linear-dielectric pillar 16; and the central square nonlinear-dielectric pillar 18 is made of a Kerr-type nonlinear material, and has a side length of 1.5d, a dielectric constant of 7.9 under low-light-power conditions and a third-order nonlinear coefficient of $1.33 \times 10^{-2}$ $\mu m^2/V^2$. Twelve rectangular high-refractive-index linear-dielectric pillars and one square nonlinear-dielectric pillar are arranged in the center of the 2D-PhC cross-waveguide nonlinear cavity in the form of a quasi-1D PhC along longitudinal and transverse waveguide directions, the central nonlinear-dielectric pillar clings to the four adjacent rectangular linear-dielectric pillars and the distance there between is 0, every two adjacent rectangular linear-dielectric pillars are spaced 0.2668d from each other, and the dielectric constant of a rectangular linear-pillar clinging to the central nonlinear pillar and close to the signal-output port is equal to that of the central nonlinear pillar under low-light-power conditions. The DFF unit 03 comprises a clock-signal-input port, a D-signal-input port and a system-output port; a clock control-signal CP is input through the input port of a two-branch waveguide, and the output port of the two-branch waveguide is connected with the input port of the NOT-logic gate 02 and another port of the two-branch waveguide is connected with the first clock-signal-input port 11 of the PhC-structure unit 01; the input signal at the first clock-signal input 11 of the PhC-unit 01 is synchronous with the clock-signal CP; the NOT-logic gate 02 output port is connected with the second clock-signal-input port 31 of the DFF unit 03; the second clock-signal-input port 31 of the DFF unit 03 is synchronous with the clock-signal CP; the NOT-logic gate 02 is arranged between the second clock-signal CP input port and the DFF unit 03, and is used for performing NOT-logic operation on the clock-signal CP, and the clock-signal CP are further projected to the clock-signal-input port 31 of the DFF unit 03; the signal-output port 14 of the PhC-structure unit 02 is connected with the D-signal-input port 32 of the DFF unit 03; the logic-signal X is connected with the logic-signal-input port 12 of the PhC-structure unit 01, i.e., the input signal at the logic-signal-input port of the PhC-structure unit is equal to the logic-signal X, the PhC-structural unit 01 takes the clock-signal CP and logic signal X as input signals, and the output signal is output from the signal-output port 14 of the PhC-structure unit 01 and is further projected to the D-signal-input port 32 of the DFF unit 03; the DFF unit 03 takes the clock-signal CP and the output signal at the signal-output port 14 of the PhC-structural unit 01 as input signals, and finally outputs by the system-signal-output port 33 of the DFF unit 03, the system-signal-output port 33 of the DFF unit 03 is the system-output port of the PhC self-AND-transformation logic gate of the present invention.

A self-AND-transformation logic function of all-optical-logic signals of the present invention can be realized by the control of the clock-signal CP, based on the photonic bandgap (PBG) characteristic, quasi-1D PhC defect state, tunneling effect and optical Kerr nonlinear effect of the 2D-PhC cross-waveguide nonlinear cavity shown in FIG. 1. Introduced first is the basic principle of the PhC nonlinear cavity in the present invention: a 2D PhC provides a PBG with a certain bandwidth, a light wave with its wavelength falling into this bandgap can be propagated in an optical path designed inside the PhC, and the operating wavelength of the device is thus set to a certain wavelength in the PBG; the quasi-1D PhC structure arranged in the center of the cross-waveguide and the nonlinear effect of the central nonlinear-dielectric pillar together provide a defect state mode, which, for the input light wave reaches a certain light intensity, shifts to the operating frequency of the system, so that the structure produces the tunneling effect and signals are output from the output port 14.

Figure 2:
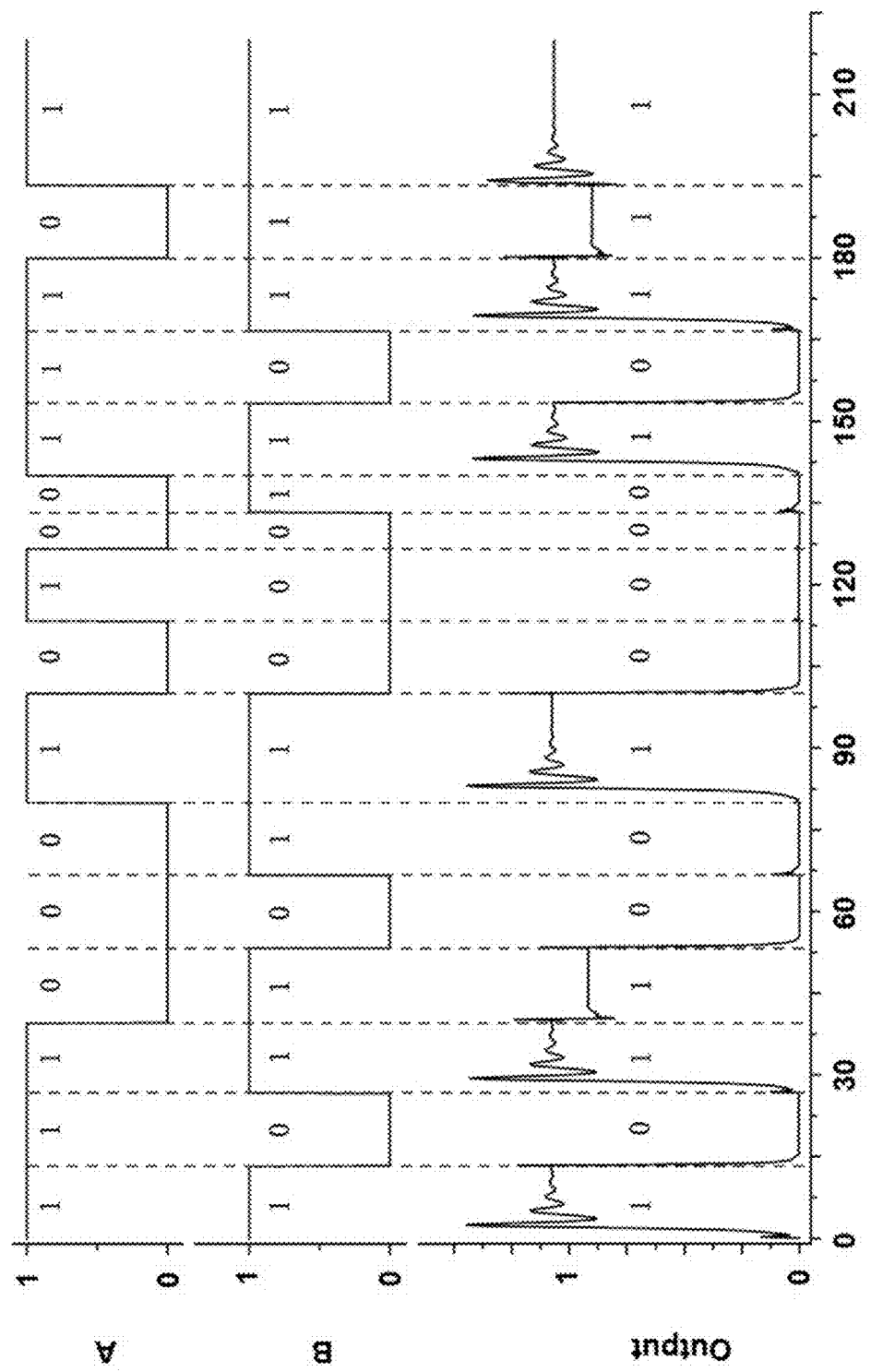
FIG. 2 is a waveform diagram of the basic logic functions of a PhC-structure unit shown in FIG. 1 for the lattice constant d of 1 μm and the operating wavelength of 2.976 μm.
Figure 4:
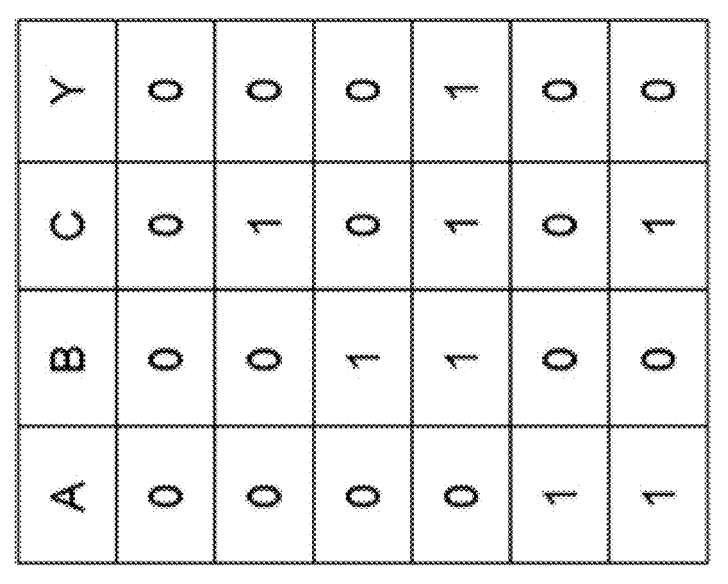

For the lattice constant d of 1 μm and the operating wavelength of 2.976 μm, referring to the 2D-PhC cross-waveguide nonlinear cavity shown by 01 of FIG. 1, and for a signal A input from the clock-signal-input port 11 and a signal B input from the intermediate signal-input port 12 shown by the upper two waveform diagrams in FIG. 2, a logic output waveform at the lower part in FIG. 2 can be obtained. A logic operation truth table of the structure shown in FIG. 4 can be obtained according to the logic operation characteristic shown in FIG. 2. In FIG. 4, C is current state $Q^n$, and Y is the signal output at the output port 24 of the PhC-structure unit 01—the next state $Q^{n+1}$. A logic expression of the structure can be obtained according to the truth table:

$$Y=AB+BC \quad (1)$$

That is $$Q^{n+1}=AB+BQ^n \quad (2)$$

According to the basic logic operation characteristic of the above 2D-PhC cross-waveguide nonlinear cavity, the logic output of the previous step serves as a logic input to the cross-waveguide nonlinear cavity itself to realize the logic functions.

The 2D-PhC structure of the device in the present invention can be of a (2k+1)×(2k+1) array structure, where k is an integer more than or equal to 3. Design and simulation results will be provided below in an embodiment given in combination with the accompanying drawings, wherein the embodiment is exemplified by an 11×11 array structure and a lattice constant d of 1 μm.

In formula (2), suppose A=1, leading to:

$$Q^{n+1}=B \quad (3)$$

In formula (2), suppose A=0, leading to:

$$Q^{n+1}=BQ^n \quad (4)$$

Thus, the signal X is input to the logic-signal-input port 22 of the PhC-structural unit 01 at the moment $t_n$, i.e., B=X; simultaneously, supposing that the input-signal A at the port 11 is equal to 1, the logic-input signal $X(t_n)$ at the moment $t_n$ is stored in an optical circuit; then, at the moment $t_{n+1}$, supposing that the input-signal A at the port 11 is equal to 0, the logic-input signal at the logic-signal-input port 12 is equal to $X(t_{n+1})$, the output of the system is $$Q^{n+1}=X(t_{n+1})X(t_n) \quad (5)$$

Thus, a clock-signal CP needs to be introduced into the system; for CP=1, the system stores the logic-input-signal X(n) at the current moment; and for CP=0, the system carries out AND operation on the logic-input-signal X(n+1) at the current moment and the signal X(n) is stored by the system at the last moment.

The optical selector switch operates as follows under the control of a clock-signal CP:

At a moment $t_n$, CP is made equal to 1, the logic-input signal at the clock-signal-input port 11 of the PhC-structure unit 01 is synchronous with the clock-signal CP, i.e., A=CP=1, the logic-input signal at the logic-signal-input port 12 is equal to X(n) at the current moment, the output at the port 14 at this moment can be obtained from the expression (2):

$$Q^{n+1}=X(n) \quad (6)$$

At a moment $t_n$, CP is made equal to 0, the logic-input signal at the clock-signal-input port 11 of the PhC-structure unit 01 is synchronous with the clock-signal CP i.e., A=CP=0, the logic-input signal at the logic-signal-input port 12 is equal to X(n+1) at the current moment, the output at the port 14 at this moment can be obtained from the expression (2):

$$Q^{n+1}=X(n+1)X(n) \quad (7)$$

The output at the output port 14 of the PhC-structure unit 01 is equal to the input at the D-signal-input port 32 of the DFF unit 03, and it can be obtained from the expressions (6) and (7) that the input signal D at the D-signal-input port 32 is X(n) for CP=1 and is X(n+1) X(n) for CP=0.

Because the clock-signal-input port 31 of the DFF unit 03 is connected with the output port of the NOT-logic gate 02, the system output of the DFF unit 03 follows the input signal D for CP=0; and for CP=1, the system output keeps the input signal D at the previous moment, thus, it can be known that the output $Q^{n+1}$ at the system-output port 33 of the device in the present invention is $Q^{n+1}$X(n+1) X(n) when CP=0; and at a next moment for CP=1, the system output keeps the output at the previous moment, i.e., the system output in a clock cycle is:

$$Q^{n+1}=X(n+1)X(n) \quad (8)$$

Hence, the device in the present invention can realize the self-AND-transformation logic function of logic-signals.

For the operating wavelength of the device is 2.976 μm, the lattice constant d of the PhC-structure unit 01 is 1 μm; the radius of the circular high-refractive-index linear-dielectric pillar 15 is 0.18 μm; the long sides of the first rectangular high-refractive-index linear-dielectric pillar 26 are 0.613 μm, and the short sides are 0.162 μm; the size of the second rectangular high-refractive-index linear-dielectric pillar 17 is the same as that of the first rectangular high-refractive-index linear-dielectric pillar 16; the side length of the central square nonlinear-dielectric pillar 18 is 1.5 μm, and the third-order nonlinear coefficient is 1.33×10⁻² μm²/V²; and the distance between every two adjacent rectangular linear-dielectric pillars is 0.2668 μm. Based on the above dimensional parameters, for the logic signal X(n) input according to the waveform shown in FIG. 3, a system-output waveform diagram at the lower part of FIG. 3 can be obtained under the control of the clock-signal CP. Hence, the system carries out AND-logic operation on the logic-input quantity X(n+1) and the logic-input quantity X(n) at the previous moment. That is, the self-AND-transformation logic function of logic-signals is realized.

Figure 3:
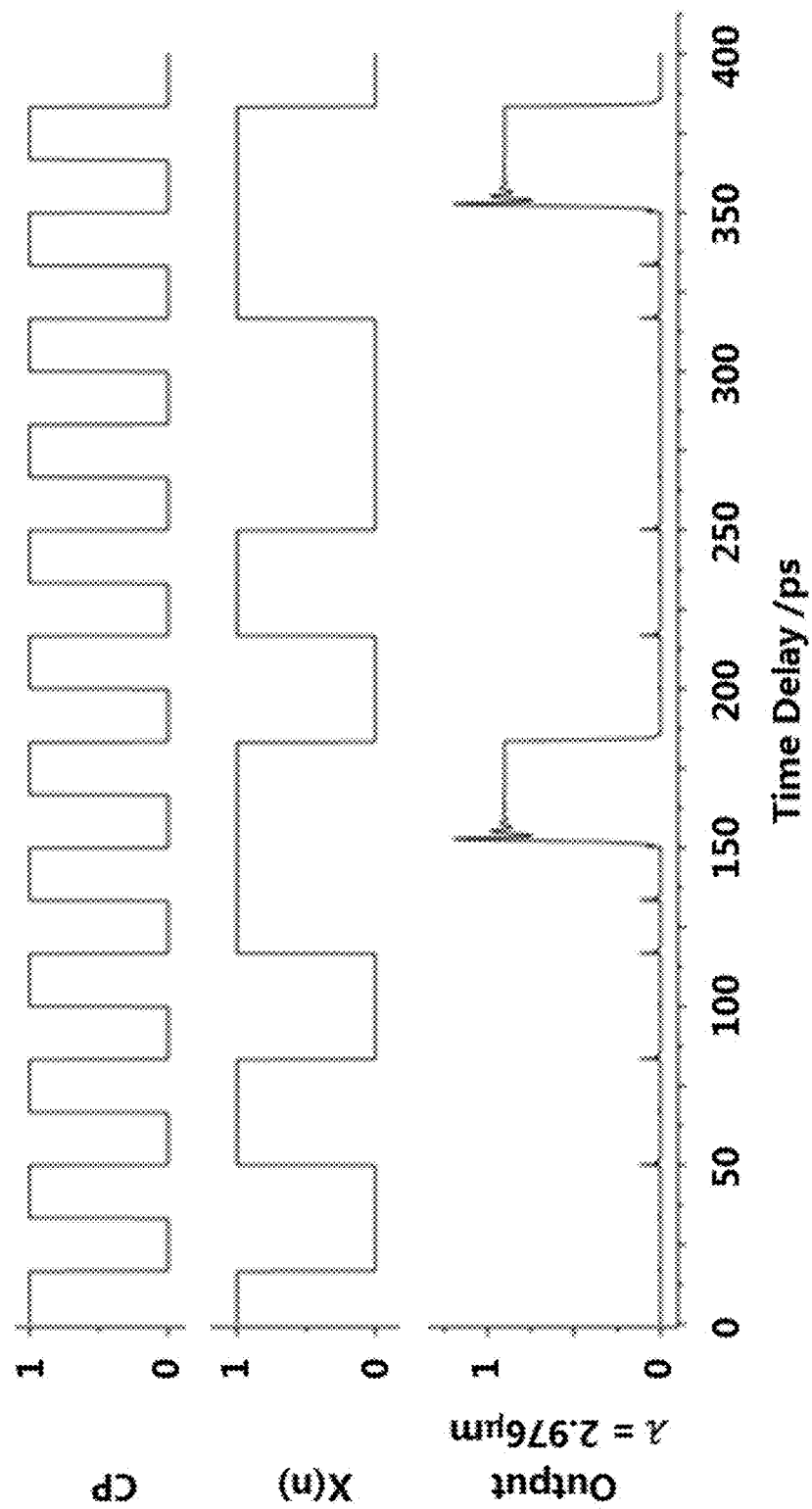
FIG. 3 is a waveform diagram of the logic-signal all-optical self-AND-transformation logic function of the present invention for the lattice constant d of 1 μm and the operating wavelength of 2.976 μm.

With reference to FIG. 3, the device in the present invention can realize the same logic function under different lattice constants and corresponding operating wavelengths by scaling.

To sum up, the self-AND-transformation logic function of the all-optical-logic signal can be realized by the control of the clock-signal CP at the clock-signal-input port under cooperation with the NOT-logic gate and the DFF.

In the logic-signal processing in an integrated optical circuit, self-convolution operation of a single logic signal can be defined, and the above-mentioned self-AND logic operation of logic-signals is a basic operation of the self-convolution operation of logic-signals. The self-AND-transformation logic function of logic-signals realized in the present invention plays an important role in realizing self-correlation transformation or self-convolution operation of logic variables.

While the invention has been described in terms of various specific embodiments, those skilled in the art will recognize that the invention can be practiced with modification within the spirit and scope of the claims.

What is claimed is:

1. A Photonic Crystal (PhC) all-optical self-AND-transformation logic gate, comprising:

a PhC-structure unit, a NOT-logic gate and a D-type flip-flop (DFF) unit; a clock-signal (CP) of the PhC-structure unit is input through an input port of a two-branch waveguide, and an output port of the two-branch waveguide is connected with an input port of the NOT-logic gate, and another output port of the two-branch waveguide is connected with a first clock-signal-input port of the PhC-structure unit; an input signal at the first clock-signal-input port of the PhC-structure unit is synchronous with the clock-signal (CP); an output port of said NOT-logic gate is connected with a second clock-signal-input port of the DFF unit; a signal-output port of the PhC-structure unit is connected with a D-signal-input port of the DFF unit; a logic-signal (X) is connected with a logic-signal-input port of said PhC-structure unit:

the PhC-structure unit takes the clock-signal (CP) and the logic signal (X) as input signals; under the control of the clock-signal (CP), the clock-signal (CP) is equal to one at a time, a logic-input signal (X) is X(n), the signal-output port of the PhC-structure unit is X(n); the clock-signal (CP) is equal to zero at a time being a clock cycle after the previous time, a logic-input signal (X) is X(n+1), and a system-output port equals AND-logic operation on the logic-input signal X(n+1) and the logic-input signal X(n) at the previous moment in a clock cycle; and the self-AND-transformation logic function of logic-signals is achieved.

2. The PhC all-optical self-AND-transformation logic gate in accordance with claim 1, wherein said PhC-structure unit is a 2D-PhC cross-waveguide nonlinear cavity and is a 2D-PhC cross-waveguide four-port network formed by high-refractive-index dielectric pillars, the four-port network has a four-port PhC structure, a left port is a first intermediate-signal-input port, a lower port is a second intermediate-signal-input port, an upper port is a signal-output port, and a right port is an idle port; two mutually-orthogonal quasi-1D PhC structures are placed in two waveguide directions crossed at a center of the cross-waveguide, a nonlinear dielectric pillar is arranged in a middle of said cross-waveguide, the nonlinear dielectric pillar is made of a nonlinear material, and a cross section of the nonlinear dielectric pillar is square, polygonal, circular, or oval; and a dielectric constant of a rectangular linear dielectric pillar clinging to the nonlinear dielectric pillar and close to the signal-output port is equal to that of the nonlinear dielectric pillar under low-light-power conditions; and said quasi-1DPhC structures and the nonlinear dielectric pillar constitute a waveguide defect cavity.

3. The PhC all-optical self-AND-transformation logic gate in accordance with claim 2, wherein the 2D-PhC is a (2k+1)×(2k+1) array structure, where k is an integer more than or equal to 3.

4. The PhC all-optical self-AND-transformation logic gate in accordance with claim 2, wherein said cross section of the high-refractive-index dielectric pillar of the 2D-PhC is circular, oval, triangular, or polygonal.

5. The PhC all-optical self-AND-transformation logic gate in accordance with claim 2, wherein a background filling material for the 2D-PhC is a different low-refractive-index medium with a refractive index less than 1.4.

6. The PhC all-optical self-AND-transformation logic gate in accordance with claim 2, wherein a background tilling material for the 2D-PhC is air.

7. The PhC all-optical self-AND-transformation logic gate in accordance with claim 2, wherein the refractive index of the dielectric pillar in the quasi-1D PhC of the cross-waveguide is a different value more than 2.

8. The PhC all-optical self-AND-transformation logic gate in accordance with claim 2, wherein the refractive index of the dielectric pillar in the quasi-1D PhC of the cross-waveguide is 3.4.

9. The PhC all-optical self-AND-transformation logic gate in accordance with claim 2, wherein the cross section of the dielectric pillar in the quasi-1D PhC is rectangular, polygonal, circular, or oval.

10. The PhC all-optical self-AND-transformation logic gate in accordance with claim 1, wherein the DFF unit comprises a clock-signal-input port, a D-signal-input port and a system-output port; and the D-signal-input port of the DFF unit is connected with the signal-output port of said PhC-structure unit.

* * * * *